United States Patent [19]
Weber

[11] 3,722,286
[45] Mar. 27, 1973

[54] DYNAMIC GRAVITATIONAL FORCE GRADIENT TRANSDUCER

[75] Inventor: Joseph Weber, Chevy Chase, Md.

[73] Assignee: Hughes Aircraft Company, Culver City, Calif.

[22] Filed: Sept. 28, 1964

[21] Appl. No.: 399,682

[52] U.S. Cl. ................................................. 73/382
[51] Int. Cl. ............................................. G01v 7/04
[58] Field of Search ........................... 73/382, 505

[56] References Cited

UNITED STATES PATENTS

| | | | |
|---|---|---|---|
| 2,712,753 | 7/1955 | Campbell | 73/67.2 |
| 3,044,290 | 7/1962 | Rawding | 73/67.2 |
| 3,273,397 | 9/1966 | Forward | 73/382 |
| 3,091,708 | 5/1963 | Harris | 310/8.2 |

OTHER PUBLICATIONS

"Detection and Generation of Gravitational Waves" by J. Weber in Physical Review, Vol. 117, No. 1, Jan. 1, 1960 (pp. 306–313)

*Primary Examiner*—James J. Gill
*Attorney*—James K. Haskell and Earnest F. Oberheim

[57] ABSTRACT

This is a dynamic gravitational force gradient transducer wherein a dynamic gravitational force gradient having a characteristic frequency interacts with a dynamic stress-energy-momentum tensor in a dynamic mass quadrupole. There is also provided electrical input-output means coupled to the mass quadrupole to form an electrodynamical circuit which is resonant at the characteristic frequency of the force gradient.

11 Claims, 13 Drawing Figures

INVENTOR.
JOSEPH WEBER,
BY J. K. Haskell
ATTORNEY.

INVENTOR
JOSEPH WEBER,
BY J.K. Haskell
ATTORNEY.

INVENTOR.
JOSEPH WEBER,
BY J. K. Haskell
ATTORNEY.

DYNAMIC GRAVITATIONAL FORCE GRADIENT TRANSDUCER

This invention relates to a gravitational force gradient transducer and particularly to an instrument for the generation and detection of dynamic gravitational force gradients and the signaling between two such devices by means of dynamic gravitational fields.

Such dynamic gravitational fields take many forms. One form is the time varying portion of the Newtonian gravitational force gradient field of an oscillating or rotating asymmetric mass. Another form is the gravitational radiation described by the Einstein theory of gravity (General Theory of Relativity) that is emitted by an accelerated mass quadrupole. Still another form is the effective dynamic gravitational force gradient field that is created by the relative motion of a detecting instrument through the static gravitational force gradient of a mass.

The generation and detection of dynamic gravitational force gradients is of importance in technological and scientific areas. It is of great importance to technology to have an instrument that will detect and measure the Newtonian gravitational force gradient fields existing around large ore bodies and oil-containing formations while being operated on a moving platform. It is of further importance to technology to have generators of dynamic gravitational force gradient fields to test the detectors of the invention as well as sensitive inertial devices such as low level accelerometers prior to their use in the field. It is still of further interest to technology to have a method of signaling in and out of electromagnetically and acoustically isolated enclosures. It is also of great scientific importance to study the gravitational radiation emitted by astronomical sources such as rotating binary stars and exploding stars and galaxies to determine the inner structure of these bodies, their dynamic behavior and the radiation generation mechanisms. It is of further scientific importance to study the gravitational fields surrounding an oscillating or rotating asymmetric mass to investigate the validity of Newton's laws of gravity in the high frequency region.

Prior to the devices described in the present invention, there existed devices for the detection and measurement of the anomalies created by geological formations. One instrument presently in use for measuring static gravitational gradients is the Eotvos torsion balance which employs two equal weights on wires of two different lengths connected by a horizontal beam and suspended by a torsion fiber so that it is free to rotate in a horizontal plane about the fiber. The beam rotates only when a differential horizontal force acts on the weights, and this occurs when the gravitational field is distorted so that the horizontal component at one end is different from that at the other. A number of measurements are taken with the beam at different azimuthal orientations and the results are employed in equations which, when solved, provide a plurality of quantities which define the gradient and curvature. The torsion balance has only limited usefulness due to the length of time required to make measurements. This long measurement time is related to the inability to separate the desired gravitational response due to the geological formation of interest from the noise sources arising from the operation of the balance and from the inherent noise of the instrument itself. The use of an instrument with dynamic response characteristics such as the devices of the invention operated in a manner which creates a dynamic interaction between the instrument and the gravitational field of the geological formations will create a dynamic instrument response with frequency characteristics that allow the desired signal to be separated from the noise by frequency filtering techniques.

Prior to the devices described in the present invention, there did exist devices for the generation of dynamic gravitational fields. Such devices are typically two equal masses connected by a rod and rotated about their center of mass. A survey of such work was recently published by J. C. Cook, "On measuring the Phase Velocity of an Oscillating Gravitational Field," J. Franklin Inst., 273, pp. 453–471, (June 1962). However, due to the strong centrifugal forces that are induced in these types of devices by their rotation, they have the disadvantage of being limited by the strength of materials to relatively low rotation rates. And also, because of this strength limitation, the rotating devices of the prior art are not capable of generating appreciable dynamic gravitational fields in the higher frequency regions as are the devices of the present invention.

However, there did not exist in the prior art any adequate method for measurement of the dynamic gravitational force gradient fields created by sources of interest to the scientific community. There do exist devices for the measurement of the dynamic force fields created by the Newtonian gravitational attraction of rotating or oscillating asymmetric masses. Such devices usually take the form of an oscillatory pendulum (see J. C. Cook, FIG. 2). These pendulum devices are force measuring devices and as such are not only sensitive to the Newtonian gravitational force, but are also sensitive to the inertial forces caused by rotations and vibrations. The field of interest in scientific work is the gradient of the dynamic gravitational force field. The gravitational radiation emitted by astronomical sources is of a force gradient or tensor type (rather than of a force or vector type as is electromagnetic radiation) and therefore requires an instrument that responds to dynamic gravitational force gradients. The dynamic Newtonian gravitational fields surrounding an oscillatory or rotating asymmetric mass contain both force fields and force gradient fields, but the only part that can be unambiguously assigned to gravitational effects is the dynamic force gradient, and therefore an instrument that responds only to the force gradient and does not respond to the force itself is required in order to separate the desired gravitational signal from the inertial noises.

Also, prior to the devices described in the present invention, there did not exist any adequate method for signaling between two acoustically and electromagnetically isolated points through dynamic gravitational interactions.

Accordingly, it is an object of the present invention to provide an instrument for the detection of geological formations from a moving platform.

It is another object of this invention to provide an instrument for the detection of dynamic gravitational force gradient fields.

Yet another object of the invention is to provide an instrument for the detection of gravitational radiation.

Still another object of the present invention is to provide an instrument for the measurement of the dynamic gravitational fields surrounding an oscillating or rotating asymmetric mass.

It is still another object of this invention to provide an instrument for the generation of dynamic gravitational force gradient fields.

Yet another object of the invention is to provide an instrument for the generation of gravitational radiation.

Still another object of the invention is the transmission of energy by means of dynamic gravitational interactions.

And another object of the invention is that of signaling by means of dynamic gravitational interactions.

And yet another object of the invention is the signaling by means of gravitational radiation.

These and other objectives are achieved by a dynamic gravitational force gradient transducer according to the invention comprising a mass quadrupole arrangement bilaterally coupled to a dynamic gravitational force gradient having a characteristic frequency. The mass quadrupole coupling to the dynamic gravitational field occurs through one or more components of the dynamic stress-energy-momentum tensor contained in the mass quadrupole arrangement. Coupled to the mass quadrupole is an electrical input-output means, that in conjunction with the components comprising the dynamic stress-energy-momentum tensor, includes an electrodynamical circuit which is resonant at a selected frequency corresponding to the characteristic frequency of the dynamic gravitational force gradient. The electrical input-output means propagates therein energy corresponding to the magnitude and phase of the dynamic gravitational force gradient.

The invention and specific embodiments thereof will be described hereinafter by way of example and with reference to the accompanying drawing, in which.

Figure 2:
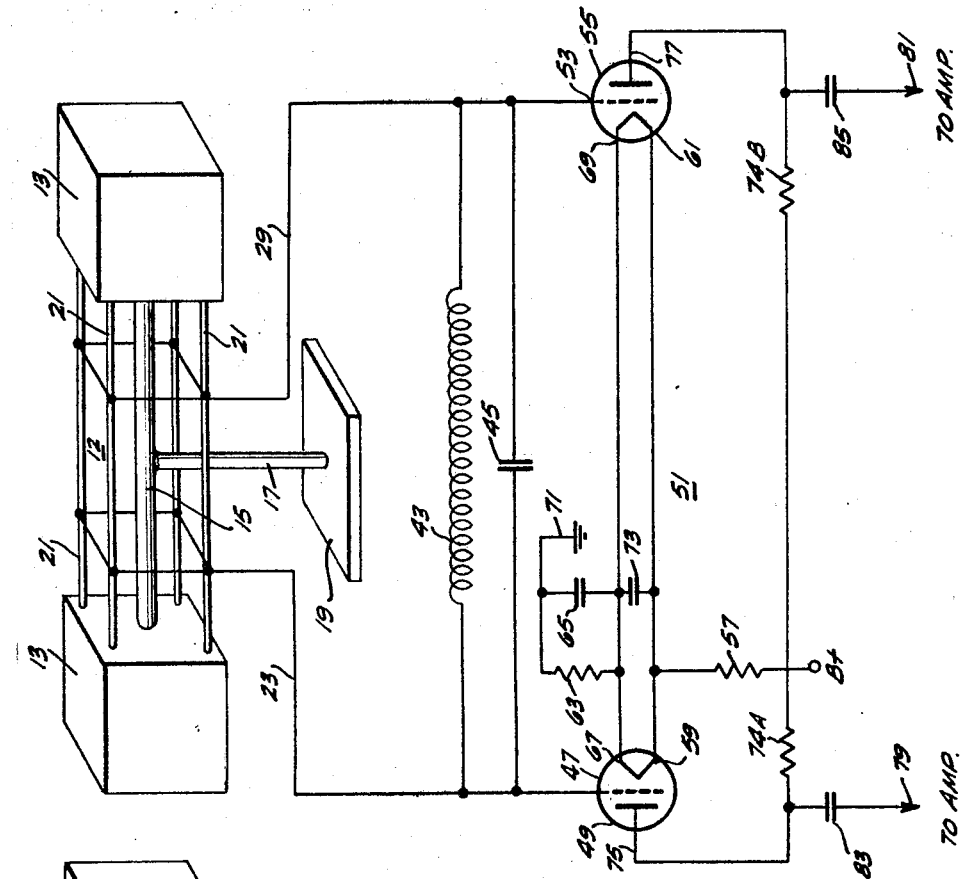
FIG. 2 is a perspective view of a detector of dynamic gravitational force gradient fields constructed in accordance with the invention and including a schematic representation of the electronic circuitry.

The generation and detection of dynamic gravitational force gradient fields and the signaling between two such devices by means of dynamic gravitational fields is accomplished in accordance with the present invention by following the concept that any mass quadrupole containing nongravitational energy storage mechanisms will act as a transducer to convert dynamic gravitational energy into some other form of energy. Usually the energy storage mechanism will be in the form of a resonant electrodynamical circuit including a dynamic stress-energy-momentum tensor. For optimum coupling between the mass quadrupole and the dynamic gravitational force gradient field, the frequency of the resonant circuit and the dynamic gravitational field must be the same and the orientation of the mass quadrupole and the gravitational field chosen properly.

The dynamic stress-energy-momentum tensor as used here is meant to describe the various forms of matter and energy that interact with dynamic gravitational fields, either to be a source of a dynamic gravitational field or to react to the forces exerted by the gravitational fields generated by other sources. These forms of gravitationally active matter include, for example, not only the ordinary physical masses that are used in the usual discussion of gravitational interactions that assume only the simplest version of Newton's law of gravity, but also the energy and momentum associated with electric and magnetic fields and electromagnetic radiation, the energy and momentum associated with mechanical stresses in material bodies and the electromechanical or magnetomechanical stresses that can be set up in electrically or magnetically active material bodies in intimate interaction with electric or magnetic fields. A well-known example of this is the combined interactions of magnetic fields and conducting fluids in the field of magnetohydrodynamics. Other forms of the stress-energy-momentum tensor are also possible, such as pressure, and the dynamic forms of all of these can be utilized to generate and detect dynamic gravitational fields in the spirit of the invention.

Any mass quadrupole by definition has mass, so therefore, it contains at least one component of the stress-energy-momentum tensor in the form of mass so that it can interact with gravitational fields. One example of this is the gravitational force field. Since it is a mass quadrupole however, it can also interact with the gradient of the gravitational force field. (A single mass point also has a mass and also interacts with gravitational force fields, but not with the gradient of the gravitational force field.) In addition to the mass component of the stress-energy-momentum tensor in the mass quadrupole however, there usually exists other forms as well, such as electromagnetic fields or mechanical stresses that may be just as effective or even more effective than the masses proper in the interaction with dynamic gravitational force gradients.

An electrodynamical circuit is defined here as any combination of the various forms of the stress-energy-momentum tensor with one or more electric, magnetic or mechanical storage elements or active electronic circuits which act as storage elements, and an electrical input-output means. For one example, the electrodynamical circuit could be one consisting entirely of electromagnetic fields, moving charges and alternating currents such as an electromagnetic cavity filled with ionized gas where the electrons are driven by electromagnetic fields set up by alternating currents in a probe inserted into the cavity. For another example, the electrodynamical circuit could be an electromechanical circuit consisting of accelerated masses interconnected by mechanical vibrations and coupled to an electrical amplifier by a piezoelectric transducer. For yet another example, the electrodynamical circuit could be a Beams type magnetic suspension consisting of two iron masses, one passive and the other active with the relative position of the two masses maintained by a servoamplifier circuit with the error voltage monitored as the output signal.

In other words, the definition of electrodynamical circuit is to mean either an electromechanical circuit or a servoamplifier circuit of a dynamic electronic circuit.

Now, if it is wished to have control over the interaction of the mass quadrupole with the dynamic gravitational force gradient fields, a way must be found to couple to the dynamic stress-energy-momentum tensor with the various types of electronic apparatus in order to form an electrodynamical circuit. For those forms of a mass quadrupole that contain an electric or magnetic or electromagnetic form of the dynamic stress-energy-momentum tensor, it is relatively easy to couple a wire to a voltage point, a loop around a current point or a waveguide to an iris in a cavity and insert or extract electrical energy. For those forms of a mass quadrupole that contain mechanical vibrations, it has been found that it is easier to couple to the vibrations of the vibrating system by interacting with the strains at the nodes rather than the more common and obvious method of interacting with the motions at the antinodes. However, it may in certain instances be advantageous to couple to the motions at the antinodes. This may be accomplished by the conventional use of capacitive, inductive and magnetostrictive devices.

To couple to these strains, strain transducers (which do not interact with motion directly) may be attached at the nodes where the strains are a maximum. Piezoelectric crystals have been found to be satisfactory strain transducers. By proper design and choice of crystal type, crystal orientation and electrical connections, the strain energy is converted into electrical energy and vice versa by means of these transducers. These techniques are well known in the field of acoustics and can be found in references such as "Piezoelectric Crystals and Their Application to Ultrasonics" by Warren P. Mason, D. Van Nostrand Co., Princeton, New Jersey (1959).

Figure 1:
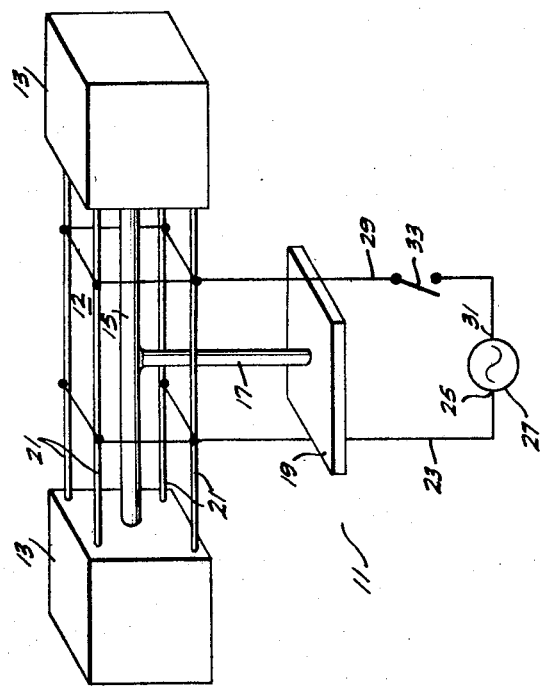
FIG. 1 is a perspective view of a generator of dynamic gravitational force gradient fields constructed in accordance with the invention.

With reference to the drawings and more particularly to FIG. 1, there is shown an exemplary embodiment of a dynamic gravitational force gradient transducer in the form of a generator of dynamic gravitational fields 11. The generator 11 includes a transducer portion 12, comprising a pair of relatively heavy masses such as steel blocks 13 symmetrically supported by a horizontally disposed elongated steel rod 15 which is in turn supported by a vertical steel rod 17 attached to a lower support member 19. Also, there is disposed symmetrically about the rod 15 between the blocks 13 four elongated quartz rods 21 which are silver plated in such a manner that there is formed two insulated and nearly half-cylindrical electrodes (not shown) along the length of each of the quartz rods 21. One of these electrodes of each of said quartz rods 21 is connected to a wire 23 which is in turn connected to a first output terminal 25 of a source of signal energy such as the generator 27 which in this case is a conventional amplitude type modulator normally used in modulating amplitude modulated class C radio-telephone transmitting equipment. The other of the electrodes of each of said quartz rods 21 is connected by conductive wire 29 to the second output terminal 31 of the generator 27 through a switch 33.

The generator 27 generates an AC output signal voltage at the frequency of resonance of the transducer portion 12 of the generator 11. The signal is carried by the wires 23 and 29 when the switch 33 is in its closed position to the quartz rods 21 through the half-cylindrical electrodes plated on these rods. The AC voltage, when applied to the quartz rods 21, causes a uniform strain throughout each of the rods 21 which causes forces to be applied to the blocks 13 by the rods 21. These forces set the blocks 13 in motion so that the blocks now constitute an accelerated mass quadrupole which quadrupole generates dynamic gravitational fields.

Referring now to FIG. 2, there is shown a detector of dynamic gravitational force gradients 41. As can be seen by comparing FIGS. 1 and 2, the mechanical structures are identical but the electronic circuitry is quite different. Accordingly, like reference numerals denote like components in these and all other figures.

In place of the generator 27, the wire 23 here connects to one terminal of a parallel inductor 43-capacitor 45 tuned circuit combination and to an input grid electrode 47 of a first electrometer vacuum tube 49 which components make up part of an input circuit to a low noise preamplifier 51. The values for the inductor 43-capacitor 45 tuned circuit are chosen to resonate at the frequency of resonance of the transducer portion 12. The wire 29 is here connected to the other terminal of the parallel inductor 43-capacitor 45 combination and to an input grid electrode 53 of a second electrometer tube 55 of the preamplifier 51. Proper filament voltage and operating bias for the tubes 49 and 55 are provided by a dropping resistor 57 connected between a 42 volt source (not shown) of B+ voltage and common connected filament terminals 59 and 61 of the tubes 49 and 55, respectively, and by a parallel resistor 63-capacitor 65 combination connected between the other filament terminals 67 and 69 and a common ground return 71. A filament bypass capacitor 73 is connected between the filaments of the tubes 49 and 55. The plate load resistors 74A and 74B of the tubes 49 and 55 are connected between the anode terminals 75 and 77, respectively, and the B+ terminal. Any signal present at the input circuit of the preamplifier 51 will be amplified and provided between output terminals 79 and 81 connected, respectively, to the anodes 75 and 77 of the tubes 49 and 55 through coupling capacitors 83 and 85. The value of the various components of the preamplifier 51 is given in the following table:

| | | |
|---|---|---|
| 49 | Type 5886 | electrometer tube |
| 55 | Type 5886 | electrometer tube |
| 57 | 2,000 ohm | 1/2 watt 5% carbon resistor |
| 63 | 150 ohm | 1/2 watt 5% carbon resistor |
| 65 | 20 mf | 50 volt capacitor |
| 73 | 50 mf | 10 volt capacitor |
| 74A | 75,000 ohm | 1 watt 5% carbon resistor |
| 74B | 75,000 ohm | 1 watt 5% carbon resistor |
| 83 | 0.1 mf | capacitor |
| 85 | 0.1 mf | capacitor |

When a dynamic gravitational force gradient field is intercepted by the transducer portion 12 of the detector 41, relative accelerations are produced between the blocks 13 in such a manner to cause uniform strain in each of the quartz rods 21. The strain is uniform in the rods 21 because the mass of the blocks 13 is much larger than the mass of the rods 21. By principles well known in the electronic art, mechanical strain on a piezoelectric material such as the quartz rods 21 cause the generation of electrical voltages at the opposite surfaces of the piezoelectric material. These voltages caused by the aforementioned uniform strain are conducted to a balanced low noise preamplifier circuit 51 by the conducting wires 23 and 29. The preamplifier 51 is adapted to amplify these voltages by a factor of approximately two to provide a relatively low noise output signal corresponding to the magnitude and phase of the dynamic gravitational force gradient intercepted by the transducer portion 12. Further amplification of the output signal from the preamplifier 51 may be obtained by coupling a balanced high gain amplifier (not shown) to the output terminals 79 and 81 of the preamplifier 51.

In order to understand the method of operation of the devices of the present invention and to demonstrate that the interactions observed are due to coupling of the devices to dynamic gravitational fields rather than some other interaction, a brief outline of the theory of dynamic gravitational interactions is here presented.

A dynamic gravitational field is defined as the time varying component of the gravitational interaction between two structures which are in relative motion. This is usually understood to means that one of the bodies is undergoing oscillatory or translational motion in inertial space and therefore its gravitational field varies with time. This time varying gravitational field will then exert time varying forces on a detecting device.

There is also another possible method for a dynamic gravitational interaction in which the source body is stationary with respect to inertial space, and its gravitational field does not vary with time, but only with position. If the detecting device is moving with respect to inertial space, then the spatially varying gravitational field of the source is transformed, in the detecting body's frame of reference, into a time varying gravitational field.

Mechanically, the two are nearly equivalent although the second type of dynamic gravitational interaction is usually more practical.

It shall be assumed that all gravitational effects are correctly described by Einstein's theory of gravity (General Theory of Relativity). (See for example A. Einstein, *The Meaning of Relativity*, 5th Edition, Princeton University Press, Princeton, New Jersey (1955); C. Moller, *The Theory of Relativity*, Oxford University Press, London (1957); or J. Weber, *General Relativity and Gravitational Waves*, Interscience Publications, Inc., New York (1961).) It shall also be assumed that the cosmological constant, sometimes included in the theory, is too small to be of interest in experimental work so that the field equations of general relativity will be assumed to have the form:

$$R_{\alpha\beta} - \tfrac{1}{2} g_{\alpha\beta} R = [(8\pi G)/c^4] T_{\alpha\beta} \qquad (1)$$

where
$c = 3.00 \times 10^8$ m/sec is the speed of light,
$G = 6.67 \times 10^{-11}$ m³/(kg sec²) is the Newtonian constant of gravity
$T_{\alpha\beta}$ is the stress-energy-momentum tensor
$g_{\alpha\beta}$ is the metric tensor describing the properties of gravitation and space which is defined by the square of the "interval" $ds$ along the space-time world line $s$ $$-ds^2 = g_{\alpha\beta} \, dx^\alpha \, dx^\beta \qquad (2)$$

with the signature chosen so that the flat space metric has the form:

$$g_{\alpha\beta} \approx \delta_{\alpha\beta} = \begin{bmatrix} -1 & 0 & 0 & 0 \\ 0 & +1 & 0 & 0 \\ 0 & 0 & +1 & 0 \\ 0 & 0 & 0 & +1 \end{bmatrix} \qquad (3)$$

$R$ is the curvature scalar obtained from the contraction of the Ricci tensor.

$$R = g^{\alpha\beta} R_{\alpha\beta} = R^\alpha_\alpha \qquad (4)$$

and $R_{\alpha\beta}$ is the Ricci tensor obtained from the contraction of the Riemann tensor.

$$R_{\alpha\beta} = R^\gamma_{\alpha\gamma\beta} \qquad (5)$$

The Riemann tensor or curvature tensor is defined in terms of the Christoffel symbols as:

$$R^\mu_{\alpha\beta\gamma} = \Gamma^\mu_{\alpha\gamma,\beta} - \Gamma^\mu_{\alpha\beta,\gamma} + \Gamma^\mu_{\delta\beta} \Gamma^\delta_{\alpha\gamma} - \Gamma^\mu_{\delta\gamma} \Gamma^\delta_{\alpha\beta} \qquad (6)$$

and the Christoffel symbols are defined in terms of the metric tensor $$\Gamma^\gamma_{\mu\alpha} = \tfrac{1}{2} g^{\gamma\delta} [g_{\delta\mu,\alpha} + g_{\delta\alpha,\mu} - g_{\mu\alpha,\delta}] \qquad (7)$$

It is assumed that the reader is familiar with tensor notation and the usual conventions such as automatic summation over repeated indices.

The Christoffel symbol defined in (7) is seen to be a convenient mathematical notation for a sum of products of the metric tensor and its first derivatives. Since the Riemann tensor (6) is defined in terms of sums and products of the Christoffel symbol and its first derivatives, it is seen to be a convenient notation for a complicated combination of sums and products of the metric tensor and its first and second derivatives. Since the Ricci tensor (5) and the curvature scalar (4) are sums of the products of the metric tensor and the Riemann tensor, this means that the left hand sides of the field equations (1) comprise a very complicated, nonlinear, second order partial differential prescription for the calculation of the components of the metric tensor, given the description and behavior of matter and energy in the form of the stress-energy-momentum tensor on the right hand sides.

The usual process of calculating the dynamical behavior of a system under the influence of gravitational and other forces is quite complicated. First, all the mass and energy in both the system being investigated and in the sources of the dynamic fields must be determined. Then, using these in a prescribed manner, the 10 components of the stress-energy-momentum tensor are calculated. Next, using the stress-energy-momentum tensor as the source term in the field equations (1), these 10 nonlinear differential equations for the ten components of the metric tensor are solved. Then the metric tensor is used in the generalized equations of motion $$\frac{d^2 x^\mu}{ds^2} + \Gamma^\mu_{\alpha\beta} \frac{dx^\alpha}{ds} \frac{dx^\beta}{ds} = \frac{F^\mu}{mc^2} \qquad (8)$$

to determine how the system behaves.

For experimental purposes, it is not necessary to use the full field equations. The gravitational forces available are nearly always weak enough so that the nonlinear terms in the field equations are negligible. Often the velocities involved are small enough so that even special relativistic effects can be ignored. Thus, it is only necessary to carry out the calculations using an appropriate approximation to the full field equations.

To obtain a simplified form of the Einstein field equations that is suitable for experimental work, the weak field approximation will be used (see Weber, p. 87ff). This approximation uses the assumption that the gravitational potential energy in the gravitational fields involved in an experiment is small compared to the kinetic energy and the rest energy of the masses and nongravitational fields used in the experiment. This assumption is satisfied to a very high degree of approximation by all conceivable experimental situations.

If the gravitational fields are weak, then the metric tensor can be approximated by $$g_{\alpha\beta} \approx \delta_{\alpha\beta} + h_{\alpha\beta} \qquad (9)$$

where $\delta_{\alpha\beta}$ is the flat space metric given previously and the $h_{\alpha\beta}$ are the perturbations of the metric introduced by the masses generating the gravitational fields. If the tensor gravitational potential is now defined as a certain combination of the perturbations $h_{\alpha\beta}$ on the flat space metric tensor $$\phi_{\alpha\beta} = h_{\alpha\beta} - \tfrac{1}{2} \delta_{\alpha\beta} h \qquad (10)$$

and the necessary substitutions are made, we find that the nonlinear Einstein field equations become linear Poisson equations, or the weak field equations $$\Box \phi_{\alpha\beta} = \Delta \phi_{\alpha\beta} - \frac{1}{c^2} \frac{\partial^2}{\partial t^2} \phi_{\alpha\beta} = -\frac{16\pi G}{c^4} T_{\alpha\beta} \qquad (11)$$

where $\Box$ is the d'Alembertian operator.

In the field equations, the stress-energy-momentum tensor is the means of coupling to the gravitational field. The various components of the stress-energy-momentum tensor are related to the density and momentum of the mass-energy involved in the devices of the invention.

The stress-energy-momentum tensor is known for a number of different sources. For electromagnetic fields, it is $$T^\beta_\alpha = \epsilon_0 \left( F_{\alpha\gamma} F^{\beta\gamma} - \frac{1}{4} \delta^\beta_\alpha F_{\gamma\mu} F^{\gamma\mu} \right) \qquad (12)$$

where the electromagnetic field tensor $F_{\alpha\beta}$ is defined in terms of the electromagnetic four-potential $A_\alpha$ as $$F_{\alpha\beta} = \frac{\partial A_\beta}{\partial x^\alpha} - \frac{\partial A_\alpha}{\partial x^\beta} \qquad (13)$$

In order to express the electromagnetic stress-energy-momentum tensor in terms of the more familiar electric and magnetic fields, it is necessary to separate out the space-like components of the tensor from the time-like components. The space-like components are just the components of the three dimensional electromagnetic stress tensor $$T_{ab} = E_a D_b + H_a B_b - \tfrac{1}{2} \delta_{ab} (E_c D_c + H_c B_c) \qquad (14)$$

while the time-like components are related to the momentum $G_a$ of the electromagnetic waves $$T_{oa} = T_{ao} = cG_a = 1/c\, (E \times H)_a \qquad (15)$$

and the energy density of the electromagnetic fields.

$$T_{oo} = \tfrac{1}{2} (\epsilon_o E^2 + \mu_o H^2) \qquad (16)$$

Since electromagnetic fields have a stress-energy-momentum tensor, and this tensor is the source of gravitational fields by Einstein's law of gravity, then a dynamic electromagnetic field can couple to a dynamic gravitational field through the dynamic electromagnetic stress-energy-momentum tensor.

The stress-energy-momentum tensor for physical matter is $$T_{\alpha\beta} = \mu c^2 U_\alpha U_\beta + S_{\alpha\beta} \quad (17)$$

where $\mu$ is the density of the matter, $S_{\alpha\beta}$ is the elastic stress tensor of the material and $U_\alpha$ is the four-velocity defined by $$U^\alpha \equiv \frac{1}{c}\frac{dx^\alpha}{d\tau} = \frac{dt}{d\tau}\left(1, \frac{v^a}{c}\right) \begin{matrix} \alpha = 0 \to 3 \\ a = 1 \to 3 \end{matrix} \quad (18)$$

where $v^a$ is the physical velocity. Thus, mechanical stresses can couple to gravitation through the stress-energy-momentum tensor. If the material is a fluid, then the elastic stress tensor degenerates into the scalar pressure $S_{\alpha\beta}\ p$ and the stress-energy-momentum tensor becomes $$T^{\alpha\beta} = (p + \mu c^2) U^\alpha U^\beta + \delta^{\alpha\beta} p \quad (19)$$

Thus, dynamic pressure fluctuations can couple to dynamic gravitational fields through their contribution to the stress-energy-momentum tensor. If the energy and momentum in the stress or pressure fields can be neglected in comparison to the rest mass energy and momentum of the masses involved, then the stress-energy-momentum tensor has the simplified form $$T^{\alpha\beta} = \mu c^2 U^\alpha U^\beta \quad (20)$$

so that oscillating masses can couple to dynamic gravitational fields through their contribution to the stress-energy-momentum tensor. Because gravitational experiments nearly always involve the use of physical masses with their large amounts of concentrated energy density, it is this final form of the stress-energy-momentum tensor that is usually used for calculations. However, under certain conditions and especially for high frequency operation, the electromagnetic and mechanical stress contributions become as important as the mass motion contribution.

The simplest approximation to the weak field equations assumes that the only sources of gravitational effects are physical masses and that the masses involved not only have weak gravitational fields, but they also have low rotational rates or velocities compared with the speed of light. In this approximation, the only component of the stress-energy-momentum tensor (20) that is not negligible is $$T_{00} = \mu c^2 \quad (21)$$

Since the velocities are assumed to be low, the time derivatives of the gravitational potential are smaller than the spatial gradients of the potential so the weak field equations (11) reduce to $$\phi_{00} = -[(16\pi G)/c^2]\mu \quad (22)$$

The equation for the time-like component of the tensor gravitational potential (22) is a three dimensional Poisson equation which has the solution $$\phi_{00} = \frac{4G}{c^2}\int_v \frac{\mu}{r}\,dV \quad (23)$$

This component of the tensor gravitational potential is easily seen to be directly related to the scalar potential used in the Newtonian theory of gravitation $$\chi = -\frac{c^2\phi_{00}}{4} = -G\int_v \frac{\mu}{r}\,dV \approx -\frac{GM}{r} \quad (24)$$

so that, as expected, the Einstein gravitational field equations reduce to the Newtonian gravitational field equation in the lowest approximation.

Normally, the interaction of the Newtonian gravitational field with a detecting mass is considered as a purely static one, but if the position of the source mass (or the detecting mass) changes, then the gravitational field will vary with time and the interaction becomes a dynamic one.

Besides the dynamic Newtonian interaction, there is also another dynamic interaction governed by the Einstein law of gravity. This is gravitational radiation. The behavior of such radiation in any physically realizable experiment is governed by the weak field approximation to the field equations, for as it stands, the weak field approximation is a wave equation for the tensor gravitational potential $\phi_{\alpha\beta}$. The velocity of propagation is the same as the velocity of light.

The solution of the weak field wave equations with a nonvanishing source term is well known as:

$$\phi_{\alpha\beta} = \frac{4G}{c^4}\int_{v'} \frac{T_{\alpha\beta}(r, r', t - R/c)}{R}\,dV' \quad (25)$$

where $r$ is the field point, $r'$ is the source point and $R = r - r'$ is the distance from the source point to the field point.

The straightforward method of finding the solutions to these equations is to calculate the kinetic and stress energy in the source and use these directly. However, because of the laws of conservation of energy and momentum the various components of the stress-energy-momentum tensor are not independent and it is possible to convert the integrals over the stresses into integrals over the more easily identified motional energy of the sources. When we do this, we see that the spatial components of the tensor gravitational potential depend upon the second time derivatives of the mass quadrupole moment of the source $$\phi^{ab} = \frac{2G}{c^4 R}\frac{\partial^2}{\partial t^2}\int_{v'} \mu x^a x^b\,dV' \quad (26)$$

This equation shows that the lowest mode of gravitational radiation possible is quadrupole radiation. Thus, in general, any accelerated (i.e., rotating or vibrating) mass quadrupole will emit gravitational radiation.

The fact that gravitational radiation is quadrupole can also be understood in terms of the law of conservation of momentum. In any system of particles, the momentum of these particles must be conserved.

$$m_1x_1 + m_2x_2 + \ldots = 0 \quad (27)$$

But the gravitational radiation that is possible from these masses must come from the acceleration of the masses and if the equation for the conversation of momentum is differentiated, then $$m_1\ddot{x}_1 + m_2\ddot{x}_2 + \ldots = 0 \quad (28)$$

so that the gravitational radiation from each part of the source is cancelled (to first order) by the gravitational radiation from some other part of the source. Thus, there is no dipole gravitational radiation, only quadrupole or higher multipole radiation.

The simplest quadrupole mass source for the calculation of gravitational radiation energy emission is two equal masses rotating about their center of mass. This rotating type of source of gravitational radiation is the one normally considered in the prior art.

The power radiated as gravitational radiation by these rotating types of systems can then be obtained from the well-known formula (see Weber, p. 97)

$$P = (32 \, GI^2\omega^6)/(5 \, c^5) \quad (29)$$

where $I = 2ma^2$ is the moment of inertia of the source. Although this formula was derived for one specific case, it also applies to any other linear system of masses. The only different is the specific form for the moment of inertia I.

From the exponents of $I^2$ and $\omega^6$ in (29), it seems desirable, at first glance, to work with a higher rotational speed, even if it means that less mass could be used. However, it has been found that when the strength of the material is considered, it is more advantageous to lower the rotational sped and to use a greater mass. Because of this strength limitation, the rotating devices of the prior art are very inefficient and are not capable of emitting appreciable amounts of gravitational radiation, especially in the higher frequency regions. This, however, is not true of such rotating astronomical sources such as binary star systems since they are not held together by mechanical forces. Such astronomical sources emit copious amounts of gravitational radiation and this radiation can be detected by the devices of the invention.

Gravitational radiation can also arise from vibrational motion as described in the devices of the present invention. The source of the gravitational field is the stress-energy-momentum tensor $$T_{\alpha\beta} = \mu c^2 \, U_\alpha U_\beta + S_{\alpha\beta} \quad (30)$$

which depends not only on the motion of the masses $\mu$, but also on the elastic stresses $S_{\alpha\beta}$. In a vibrating system, both the mass motion and the elastic stresses are periodic and they both contribute to the gravitational radiation.

If it is assumed that acoustic resonance is present, then the power that can be emitted from a vibrating rod with a cross sectional area of A and a length of one half the acoustic wavelength is $$P = (16\pi G\rho^2 A^2 v^6 \epsilon^2)/(15 \, c^5) \quad (31)$$

where $v$ is the velocity of sound in the material, $\rho$ is the density and $\epsilon$ is the strain at resonance.

Since for acoustic resonance the ratio of the velocity of sound to the velocity of light $v/c \approx 10^{-5}$ is a limitation, it is sometimes better to suppress the acoustic resonance vibrations and use the stress tensor. This can be done by using a piezoelectric crystal and stressing it with electromagnetic energy. With the proper formation of electrodes and cavity structures, electromagnetic resonance can be obtained independently of acoustic resonance. A single large crystal, driven in this manner, will then give volume-integrated stress components which are very large. The radiated gravitational power would then be $$P = (\pi^2 G T^2 \lambda^4)/(120 \, c^3) \quad (32)$$

where $T$ is the maximum tensile strength (about $2 \times 10^8$ newtons/m$^2$), and $\lambda$ is the gravitational wavelength. In this case, since electromagnetic resonance is being used and not acoustic resonance, the wavelength is approximately twice the dimensions of the piezoelectrically filled electromagnetic cavity (depending upon the dielectric constant of the material). This vibrational method of generating high frequency gravitational radiation is orders of magnitude more efficient than the rotating devices of the prior art.

Gravitational radiation can be thought of either as a propagating gravitational field or the propagation of the curvature of space-time. This radiation, be it space curvature or gravitational field, will exert forces on objects with mass. Since gravitational radiation and all dynamic gravitational interactions are of quadrupole nature because of the conservation of momentum, it is necessary to use at least a mass quadrupole to interact with the radiation in order to detect its existence.

A mass quadrupole, by its very nature, involves a length. It is not defined at a point but exists over a region about some point in space-time. Since the masses or mass density making up the quadrupole must be at different points in space-time, they each follow their own separate equation of motion along their own world line. Then, if there are any gradients in the gravitational field or space curvature due to gravitational radiation, the paths of the two parts of the mass quadrupole will differ slightly, indicating the presence of the radiation.

Conceivably, the two particles necessary for the mass quadrupole could be in free fall (connected only by their gravitational attraction), then the passage of gravitational radiation would cause relative motion between the two particles. But then there are difficulties as to whether the particles would be able to extract energy from the radiation or whether they would just return to rest after the passage of the radiation.

If, however, the two parts of the mass quadrupole are coupled with an energy converting mechanism that transforms the stress energy introduced by the gravitational radiation into some other form of energy such as acoustic vibrations or thermal energy, then the energy, once converted by these irreversible processes, cannot be completely reconverted again into gravitational energy. Thus, the radiation can be detected by extracting some of the energy out of the wave using a mass quadrupole and an energy conversion mechanism.

There still might be some doubt as to whether the stresses due to the gravitational radiation are real and can exert strains in a material body. For example, the special relativistic contraction due to high relative motion is not a physical effect that can be sensed by the rapidly moving object, and it might be argued that because of the principle of equivalence between gravitational fields and coordinate systems a similar effect would happen with gravitational radiation. However, the principle of equivalence is only valid at a point, and a mass quadrupole does not operate over a point, so that although the acceleration of the center of mass of the mass quadrupole cannot be observed, the gradient of the acceleration can be observed by the relative acceleration of the two masses of the mass quadrupole. The reality of the tides is an excellent example: they are purely gravitational in nature, but the coordinate system that nature chooses to use for the motion of the earth has only found a way to remove the center of mass forces and has not found a way to compensate for the dynamic gradient forces; they are real and energy can and is being extracted from them.

If a mass quadrupole is used for the detection of gravitational radiation, then there is present two particles, each with its own equation of motion, and coupled together by their mutual nongravitational forces. The behavior of such a system is described by the equation of differential motion (see Weber, p. 124ff)

$$\frac{D^2 n^\delta}{Ds^2} + R^\delta_{\alpha\beta\gamma} U^\alpha U^\gamma n^\beta = \frac{D}{Dw} \frac{F^\delta}{mc^2} dw = \frac{f^\delta}{mc^2} \quad (33)$$

where $U^\alpha$ is the four velocity, $F^\delta$ is the nongravitational forces coupling the two parts of the mass quadrupole and $D/Ds$ is the covariant derivative with respect to the "time" $s$, $n^\beta$ is the "spatial" displacement of the mass points, $f^\delta$ is the force difference due to the "spatial" gradient of the force $DF^\delta/Dw$ operating across the differential "distance" $dw$, and $$R^\delta_{\alpha\beta\gamma}$$

is the Riemann curvature tensor.

Figure 3:
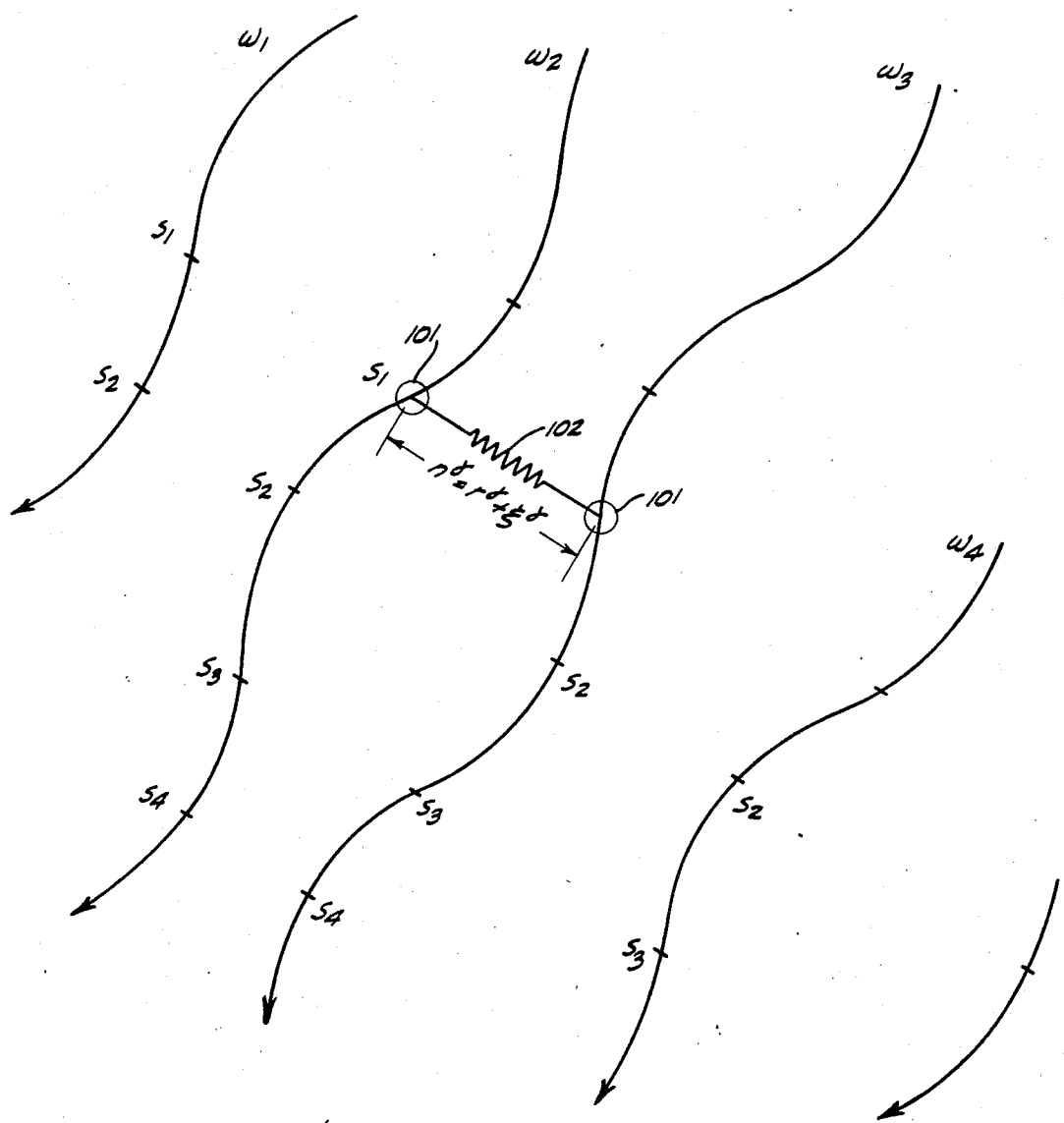
FIG. 3 illustrates schematically the interaction of a mass quadrupole with gravitational radiation.

The use of this equation may be examined for the very simple mass quadrupole detector consisting of two masses, each of mass $m$ and a spring (see FIG. 3). The two world lines $s$ of interest are those through the centers of two identical masses 101 and the distance $n^\gamma$ between the two world lines consists of the initial length $r^\gamma$ of a spring 102 which does not vary with "time" and a small time varying extension $\xi^\gamma$ $$n^\gamma = r^\gamma + \xi^\gamma \quad (34)$$

The nongravitational forces connecting the two masses 101 consists of a restoring spring force $$k^\alpha_\beta$$

plus dissipation $$d^\alpha_\beta$$

due to the motion of the spring 102.

$$-f^\gamma = k^\gamma_\alpha \xi^\alpha + cd^\gamma_\alpha \frac{D\xi^\alpha}{Ds} \quad (35)$$

In the limit of small, nonrelativistic vibrations of a freely falling detector, the equation of differential motion becomes:

$$\frac{d^2 \xi^\alpha}{dt^2} + \frac{1}{m} d^\alpha_\beta \frac{d\xi^\beta}{dt} + k^\alpha_\beta \frac{\xi^\beta}{m} = -c^2 R^\alpha_{0\beta 0} r^\beta \quad (36)$$

This is the equation for a damped harmonic oscillator driven by certain components of the Riemann tensor. Thus, by measurement of the displacement amplitude of a mechanical oscillator such as those of the present invention, the time varying space curvature induced by gravitational radiation can be calculated.

The previous description of the operation of the devices of the present invention in terms of the Einstein theory of gravity is informative and important in terms of the utilization of the devices in communication by gravitational radiation since only the Einstein theory can adequately discuss the radiation aspects of gravitation. However, for a detailed quantitative discussion of the operation of the devices of the invention, it is only necessary to assume a very simplified model that is completely describable by the Newton law of gravity.

Figure 4:
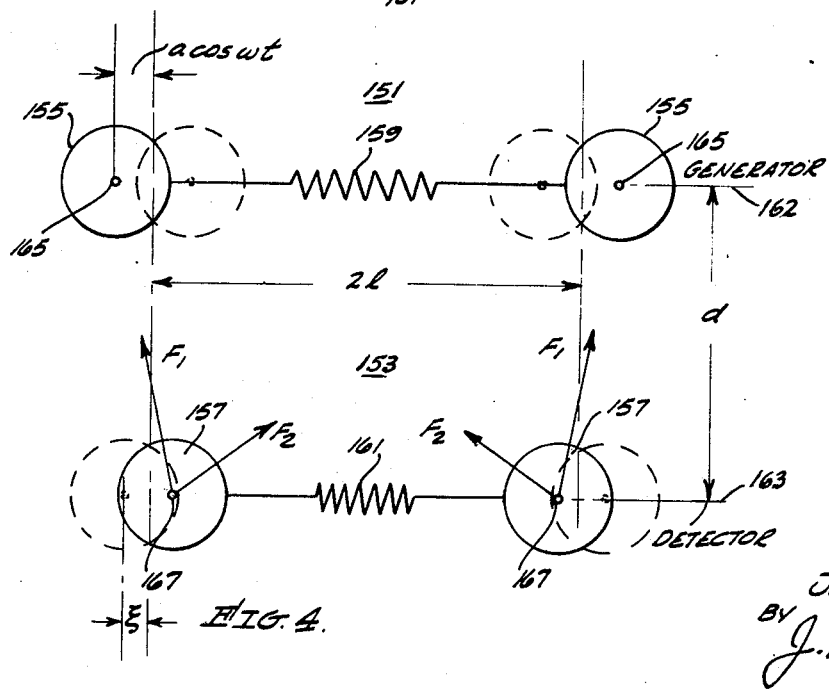
FIG. 4 is a schematic diagram of the coupling of two mass quadrupoles by dynamic gravitational fields.

The dynamic gravitational interaction of two oscillating mass quadrupoles may be investigated and are shown in FIG. 4. Each mass quadrupole 151, 153 consists of two masses 155 and 157 having a mass of $m$ connected by spring 159 and 161, respectively, of nominal length $2l$, spring constant $k$, and damping constant $D$ constrained to move only along the axis 162 and 163 through the two mass centers 165, 167. If it is assumed that the two mass quadrupoles 151, 153 are lying parallel to each other, with separation $d$ and one (the generator) is being driven by an energy source (not shown) so that the masses 155, for example, are undergoing a periodic displacement $a \cos \omega t$, then the gravitational field of the generator will contain periodic variations. These periodic variations of the gravitational field will cause periodic forces $F_1$ and $F_2$ to be exerted on the two masses 157 of the second mass quadrupole (the detector) and will cause it to respond with a periodic motion with relative amplitude $\xi$.

If Newton's law of reaction ($F = ma$) is used for the masses, then the differential acceleration of the two masses 157 of the detector caused by the differential forces of the masses 155 is given by $$\frac{Gmma \cos wt}{(d^2 + a^2 \cos^2 wt)^{3/2}} - \frac{Gmm(2l + a \cos wt)}{[d^2 + (2l + a \cos wt)^2]^{3/2}}$$

$$- k\xi - D\dot{\xi} = m\ddot{\xi} \quad (37)$$

where the first term is due to the differential forces caused by the coupling $F_1$ of the detector masses 157 to the nearest generator masses 155 and the second term is due to the differential forces caused by the coupling $F_2$ between the detector masses 157 and the furthest generator masses 155 (neglecting self interactions).

If $l > d >> \xi$ is assumed, then after simplification there is obtained an equation $$\ddot{\xi} + \frac{k}{m}\xi + \frac{D}{m}\dot{\xi} = \frac{-2Gml}{(d^2 + 4l^2)^{3/2}}$$

$$+ \frac{Gma}{d^3} \cos wt + \ldots \quad (38)$$

If the mass m and spring constant $k$ are chosen so that the detector mass quadrupole 153 is resonant at the frequency $\omega$ of the generator 151, and if the damping constant is expressed in terms of the frequency $\omega$ and energy storage factor $Q$, then the equation for the detector becomes $$\ddot{\xi} + \omega^2 \xi - (\omega/Q) \dot{\xi} = (Gma)/(2d^3) \cos \omega t \quad (39)$$

where only the gravitational force gradient term that has a frequency component at the frequency of resonance of the detector has been kept.

This is an equation for a damped harmonic oscillator and it has the solution $$\epsilon = \frac{\xi}{l} = -\frac{GmQ}{2\omega^2 l} \frac{a}{d^3} \sin \omega t \quad (40)$$

where $\epsilon$ is the strain or displacement per unit length $l$ of the detector due to the oscillation of amplitude $a$ and frequency $\omega$ of the generator a distance d away.

To obtain a quantitative estimate of the coupling to be expected from a practical physical embodiment of this simplified model, the following assumptions are made.

$$m = 10 \text{ kg}$$

$Q = 10^6$ (easily obtainable in mechanical systems)
$a/l = 10^{-3}$ (easily obtainable for transverse vibrations)
$\omega = 2\pi \times 160 \text{ cps} = 10^3$
$d = 1$ foot.

With these experimental parameters, the strain predicted by the Newtonian laws of force and gravitation is $$\epsilon = 10^{-11}$$

There exist commercially, barium titanate dynamic strain transducers which have a voltage-strain characteristic of $1.6 \times 10^5$ volts per unit strain. The voltage output of such a transducer coupled to a strain of $10^{-11}$ in the mass quadrupole detector is 1.6 microvolts. This is a voltage that is easily measured by standard voltage measurement devices.

The above discussion shows that signals can be transmitted between two mass quadrupoles by dynamic gravitational interactions and demonstrates that the devices of the invention couple to the dynamic gravitational fields in a practical and usable manner, which is completely describable in terms of the well-verified Newtonian laws of gravity as well as the Einstein theory of gravity, and shows that the observed coupling is due to dynamic gravitational interactions and not due to acoustic coupling or other extraneous factors.

Figure 5:
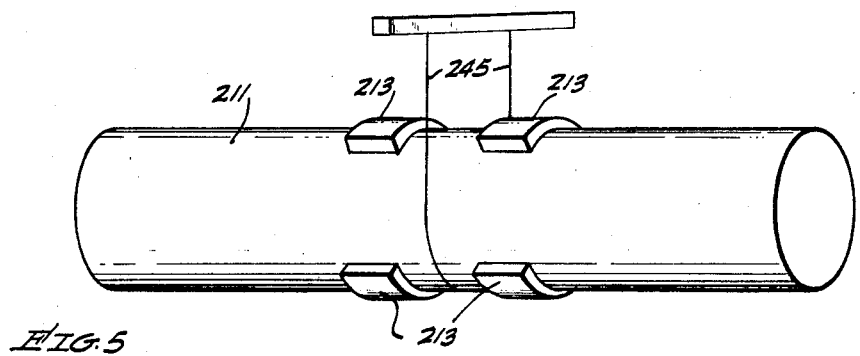
FIG. 5 is a perspective view of an acoustically resonant generator according to another embodiment of the invention.

Another embodiment of a dynamic gravitational force gradient field generator is shown in FIG. 5. An aluminum cylinder 211 is provided with four piezoelectric strain transducers 213 (see FIG. 6) which are driven by alternating electrical signals to generate strains in the cylinder 211.

The aluminum cylinder 211, as shown in FIG. 5, represents a body of elastic material with distributed mass including a mass quadrupole and is supported in the middle by a loop of wire 245. Because of its low cost, ease of fabrication and high intrinsic $Q$, 6061 aluminum was used as the cylinder 211 and operated in the first longitudinal vibrational mode. The cylinder 211 was chosen to be 5 feet long and 8 inches in diameter with a first longitudinal mode frequency of 1,657 cps and with a shallow groove (not shown) for the wire 245. In order to prevent the coupling of the cylinder 211 to the surrounding air, the cylinder 211 is placed in a conventional vacuum chamber, which is not illustrated for the sake of clarity. The chamber is maintained at a noncritical vacuum value of 500 microns or better.

To generate the strains produced within the cylinder 211, the piezoelectric strain transducers 213 are attached to the cylinder 211 at the nodes. For the first longitudinal mode, this node occurs at the middle of the cylinder 211. The cylinder 211 is supported by the loop of wire 245 at this nodal line. Since there is a minimum amount of motion at the nodal line, there will be a minimum amount of interaction with the supporting loop of wire 245 and this will minimize the non-linear or dissipative interactions that lower the $Q$. The odd higher order longitudinal modes also have a node at the middle of the cylinder 211 so that by changing the frequency of the external electronics to include or match the frequency of these odd higher harmonics the cylinder 211 can be used to generate dynamic gravitational force gradients at these other frequencies. The even order harmonics have an antinode at the middle position so therefore their measured Q is substantially less than the odd order harmonics. If it is desired to operate at an even harmonic, two or more supporting loops of wire would have to be used and placed at the nodal points whose position would vary with the particular even harmonic.

Figure 6:
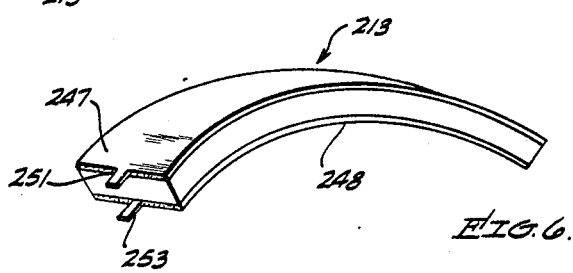
FIG. 6 is a perspective view of a particular form of the driving elements used in the generator of FIG. 5.

One of the transducers 213 is more clearly illustrated in FIG. 6. These transducers are fabricated from barium titanate ceramic and are approximately 6 inches wide, 8 inches long and 0.5 inches thick and curved to fit the surface of the cylinder 211. The top and bottom portions are plated with silver coatings 247 and 248, respectively, to act as terminals for the voltage generated by the modulator (not shown) as a means for connecting the leads (not shown) to the rest of the circuit. As shown in FIG. 6, tabs 251 and 253 are soldered to the coatings 247 and 248 of the transducer 213 to facilitate lead connection.

In order that the electric output circuit (which includes among others the transducers 213 and the output impedance of the modulator) and the mechanical vibrational resonant circuit of the cylinder 211 effectively combine to form an electromechanical circuit with a single relatively high Q resonance, it is necessary to use a sufficiently large number of transducers 213 to provide a strong coupling. For the particular embodiment constructed and shown in FIG. 5, four such transducers were used, although a somewhat lesser number may provide good results.

Figure 7:
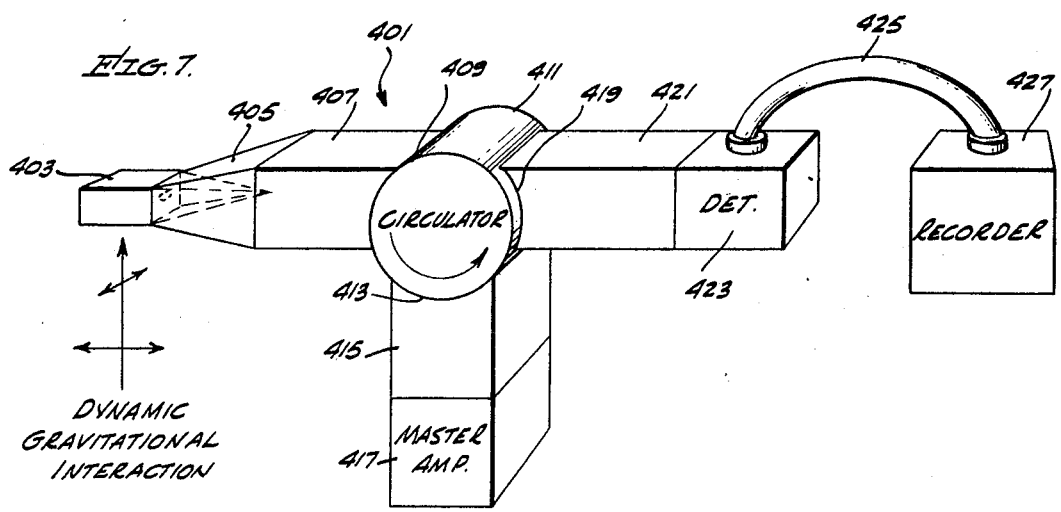
FIG. 7 is a schematic diagram of a microwave frequency type detector of dynamic gravitational force gradient fields in accordance with a further embodiment of the invention.
Figure 8:
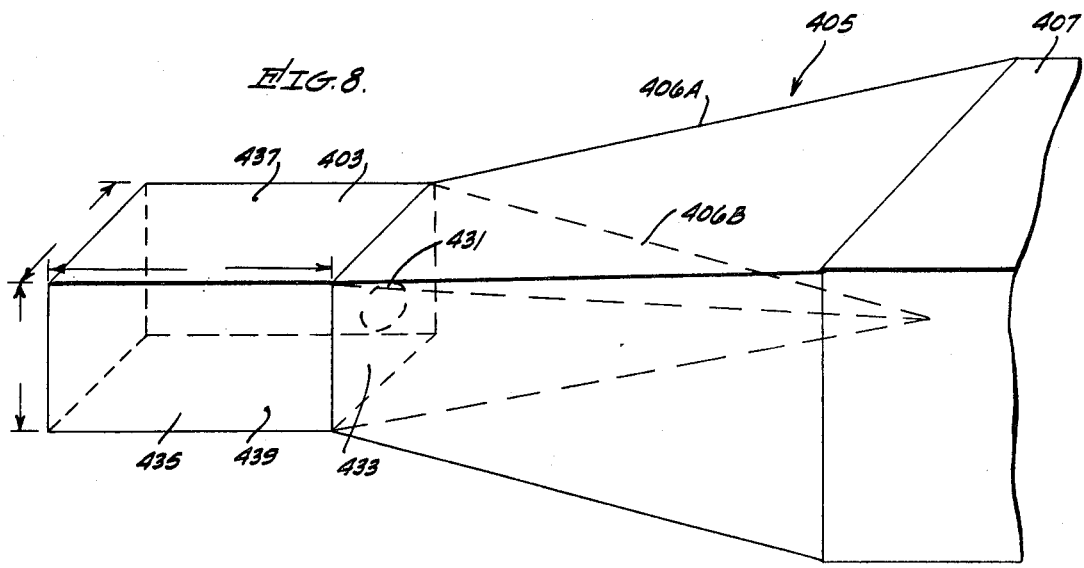
FIG. 8 is a perspective view of the transducer portion of the detector of FIG. 7 or alternatively of a generator of microwave frequency dynamic gravitational force gradient fields.

With reference to FIGS. 7 and 8, there is shown a dynamic gravitational force gradient transducer embodiment incorporating a microwave cavity type detector 401 which includes a rectangular microwave cavity structure 403 coupled by means of a tapered transition section 405, consisting of a tapered waveguide section 406A and an inverse tapered fused quartz loading section 406B disposed therein to a first rectangular waveguide section 407. The first waveguide section 407 is in turn connected to a first port 409 of a conventional microwave circulator 411. The circulator 411 includes a second port 413 connected to a second waveguide section 415 connected to a conventional maser amplifier 417. The circulator 411 also includes a third port 419 which is connected to a third rectangular waveguide section 421. The waveguide section 421 is in turn connected to a conventional microwave detector 423 which is coupled by means of cable 425 to readout device which, in this case, is a recorder 427.

The microwave cavity structure 403 (more clearly seen in FIG. 8) includes a coupling iris 431 disposed in a cavity end plate 433. The cavity 403 is filled by a piezoelectric quartz crystal 435 in a manner that its x-cut direction is parallel to the top and bottom portions 437 and 439, respectively, of the cavity 403 and normal to an axis line through the coupling iris 431. An input signal, in the form of a dynamic gravitational force gradient having characteristic frequency, for example, of 8 kmc upon impinging the crystal filled microwave cavity 403, sets up dynamic volumetric strains in the quartz crystal 435. Those dynamic strains along the active axis of $x$-cut quartz crystal 435 will cause the quartz to generate dynamic voltages through the piezoelectric effect at top and bottom portions 437 and 439, respectively, of the cavity 403 which will vary at the frequency of the dynamic gravitational field. The dynamic voltages at these points of a microwave cavity excite microwaves in the cavity 403. The microwave cavity 403 is dimensioned to be electromagnetically resonant at the frequency of the dynamic gravitational force gradient (8 kmc in this example) taking due consideration for the effect of the dimension of the iris 431 and the anistropic dielectric loading of the cavity 403 by the quartz crystal 435. The Q of the cavity 403 will be determined by wall losses, the generation of acoustic waves in the quartz 435 by coupling back through the piezoelectric effect and by extraction of energy through the coupling iris 431. The coupling iris 431 should be adjusted for best match to the cavity in a manner well known in the microwave art. The highest Q is obtained for the cavity shown by using high quality quartz and lining the cavity with a superconducting material such as lead and cooling this material along with the maser 417 so as to obtain maximum coupling to dynamic gravitational fields. A portion of the structure microwave energy is then coupled out through the iris 431, propagated through the transition 405, the first waveguide section 407, the circulator 413 and the second waveguide section 415 to the maser amplifier 417. The signal is then amplified by the low noise maser 417 and is propagated through the second waveguide section 415, the circulator 411 and the third waveguide section 421 to the microwave detector 423. The output signal from the detector 423 is then coupled to the recorder by means of cable 425 to indicate the magnitude and phase duration of the input gravitational signal.

Alternatively, the microwave cavity structure 403 may be used as a generator of dynamic gravitational fields by attaching the first rectangular waveguide section 407 to a conventional source of microwave energy, such as a magnetron (not shown). The microwave energy from the magnetron will travel back through the waveguide 407, through the iris 431 and into the microwave cavity 403, there it will generate alternating electric and magnetic fields. The alternating electric fields will induce dynamic stresses in the quartz crystal 435 which dynamic stresses will generate dynamic gravitational fields. When the transducer is used as a generator, instead of the quartz crystal 435, there may be used other types of piezoelectric crystals or ceramics, electrostrictive liquids or solid materials, or magnetostrictive materials.

Figure 9:
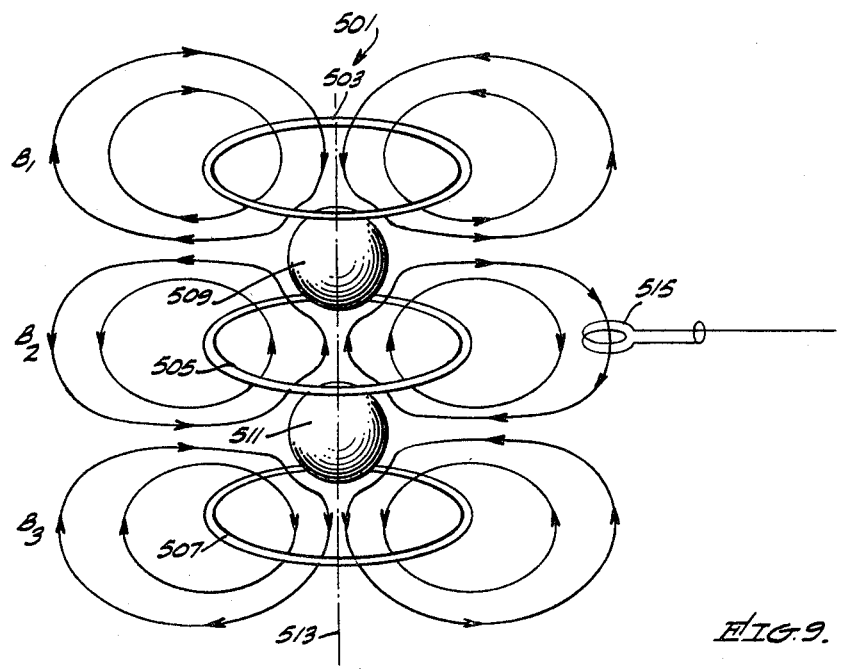
FIG. 9 is a perspective view of a magnetically levitated superconducting type detector according to a still further embodiment of the invention.

With reference to FIG. 9, there is shown a dynamic gravitational force gradient transducer embodiment 501 having three coils 503, 505 and 507, respectively, comprised of superconducting material such as lead or niobium. These coils are adapted to carry persistent currents of the order of 1,000 ampere turns and are shown as having a single turn; however, they may comprise multi-turned coils. However, the coils must form continuous loops which close upon themselves so that the current remains constant in each of the coils. The current in each coil 503, 505 and 507 then generates a magnetic field represented by the lines $B_1$, $B_2$, $B_3$, respectively. The three coils 503, 505 and 507 are rigidly fixed to a supporting structure (not shown) which is constructed of a nonsuperconducting material so that the coils 503, 505 and 507 are electrically isolated from each other. The transducer 501 is cooled to a temperature below the transition temperature of the particular superconducting material used by placing the detector 501 is a liquid helium bath (not shown) having temperature of approximately 4.2° K, for example. A first sphere 509 is symmetrically disposed between the first coil 503 and the second coil 505 and a second sphere 511 is symmetrically disposed between the second coil 505 and third coil 507. The spheres 509 and 511 comprise a mass quadrupole element. The spheres 509 and 511 can consist, however, of either solid or hollow lead or niobium spheres or a lead plated plastic sphere, for example. Thus, when introduced into the cryogenic bath, the spheres 509 and 511 also become superconducting and are levitated and contained between magnetic fields $B_1$, $B_2$ and $B_3$ generated by the coils 503, 505, and 507, respectively. The method of levitation of superconducting spheres by currents flowing in superconducting coils is well known in the superconducting gyro art. As to this point, reference may be made to an article authored by J. T. Harling and R. H. Tuffias entitled " The Cryogenic Gyro" in a book entitled Advances in Cryogenic Engineering, k. D. Timmerhaus, editor, Vol. 6 Plenum Press, Inc., New York, (1961).

The coil to sphere diameter ratio of approximately two to one may be used with the coils 503, 505 and 507 spaced approximately one sphere diameter apart. For example, for the embodiment shown in FIG. 9, the radius of the coils 503, 505 and 507 may be 4 cm, the radius of the spheres 509 and 511 equal to 2 cm and the coils spaced 2 cm apart.

The magnetic field $B_2$ of the center or second coil 505 acts as a spring-like coupling between the two masses 509 and 511. But the velocity of propagation of the coupling is the velocity of light rather than the velocity of sound and therefore the cross section for gravitational radiation, which is indicative of sensitivity, is increased substantially over than of an acoustic type detector of the same dimensions. A differential motion of the two spheres 509 and 511 in a direction along a symmetric axis through the centers of the spheres 509, 511 due to interaction with a dynamic gravitational force gradient will cause a time variation in the magnetic flux distribution in the region between the spheres 509 and 511. This time varying magnetic field is sensed by a pick up coil 515 located either outside the coil 505 as shown in FIG. 9 or at the center of this coil. Alternately, the detector 501 could be inserted in a superconducting container which has dimensions chosen so that it acts as a microwave cavity resonant at the frequency of vibration of the mass quadrupole magnetic suspension system. Thus, the high frequency magnetic variations caused by the differential motion of the masses (spheres 509 and 511) create an electromagnetic wave which will be stored in the microwave cavity. The energy so stored in the cavity can then be amplified and detected by a low noise microwave amplifier (maser, for example) and detector arrangement.

Figure 10:
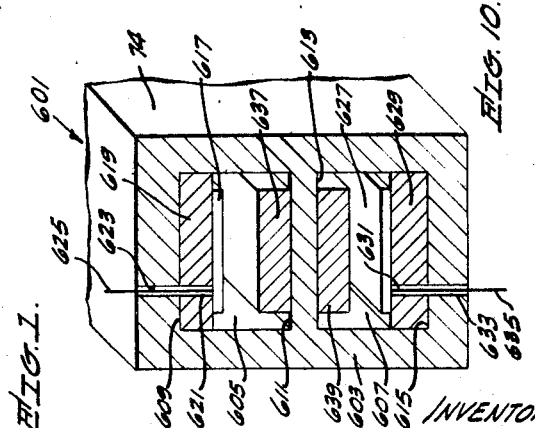
FIG. 10 is a sectional view of a piezoelectric transducer in accordance with yet a further embodiment of the invention.

With reference now to FIG. 10, there is shown a low frequency double cavity type dynamic gravitational force gradient transducer 601 consisting of a conductive double cavity structure 603 having a first chamber 605 and a second chamber 607. The first and second chambers 605 and 607 have upper and lower walls 609, 611 and 613, 615, respectively. A first conductive electrode strip 617 is disposed within the first chamber 615 and insulated from the upper wall 609 thereof by an insulating member 619 which has an opening 621 communicating with a similar opening 623 in the cavity structure 603. A conductive wire 625 is coaxially disposed through the openings 621 and 623 and connected, by soldering for example, to the first electrode 617.

Similarly, a second conductive electrode strip 627 is disposed within the second chamber 607 and insulated from the lower wall 615 thereof by an insulating member 629 which has an opening 631 communicating with an opening 633 in the cavity structure 603. A conductive wire 635 is coaxially disposed through the openings 631 and 633 and connected, by soldering, to the second electrode 627.

Also disposed in the cavity structure 603 is a first piezoelectric crystal 637 attached (by a suitable adhesive) to the lower wall 611 of the chamber 605, and a second piezoelectric crystal 639 attached to the upper wall 613 of the chamber 607. The first and second crystals 637 and 639 are so dimensioned that only the one flat surface attached to the cavity structure 603 is in contact with this structure. The crystals 637 and 639 are odd number of quarter wavelengths long at the frequency of oscillation of the device.

Figure 11:
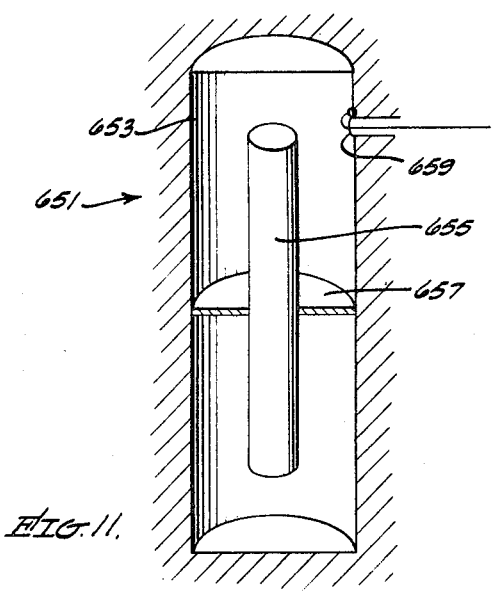
FIG. 11 is a sectional view of an electromagnetic transducer in accordance with still another embodiment of the invention.

Referring to FIG. 11, a coaxial cavity dynamic gravitational force transducer 651 is shown comprising a cylindrical cavity structure 653 of a superconducting material wherein there is coaxially disposed a superconducting center conductor 655 supported by a dielectric insulated support member 657 of fused quartz or ceramic, for example. A coupling loop 659 is disposed within the structure 653 and adapted to couple out energy propagating with the structure 653 in the form of electromagnetic waves. The transducer 651 is disposed in a liquid helium bath contained in a suitable cryogenic Dewar (not shown).

The detector 651 upon intercepting a dynamic gravitational force gradient is able to sense the same because this dynamic gravitational force gradient field tends to alternately move the electrons in the upper and lower portions of the center conductor 655 in a differential manner so that there is no electron motion at the center of conductor 655. This motion of electrons is in effect a current alternating at the frequency of the dynamic gravitational force gradient. The currents thus produced within the center conductor 655 in turn produce an electromagnetic field within the cavity structure 653. The cavity 653 is so dimensioned that it is resonant at the aforementioned frequency and this electromagnetic energy is coupled to a low noise amplifier circuit (not shown) by means of the coupling loop 659.

Figure 12:
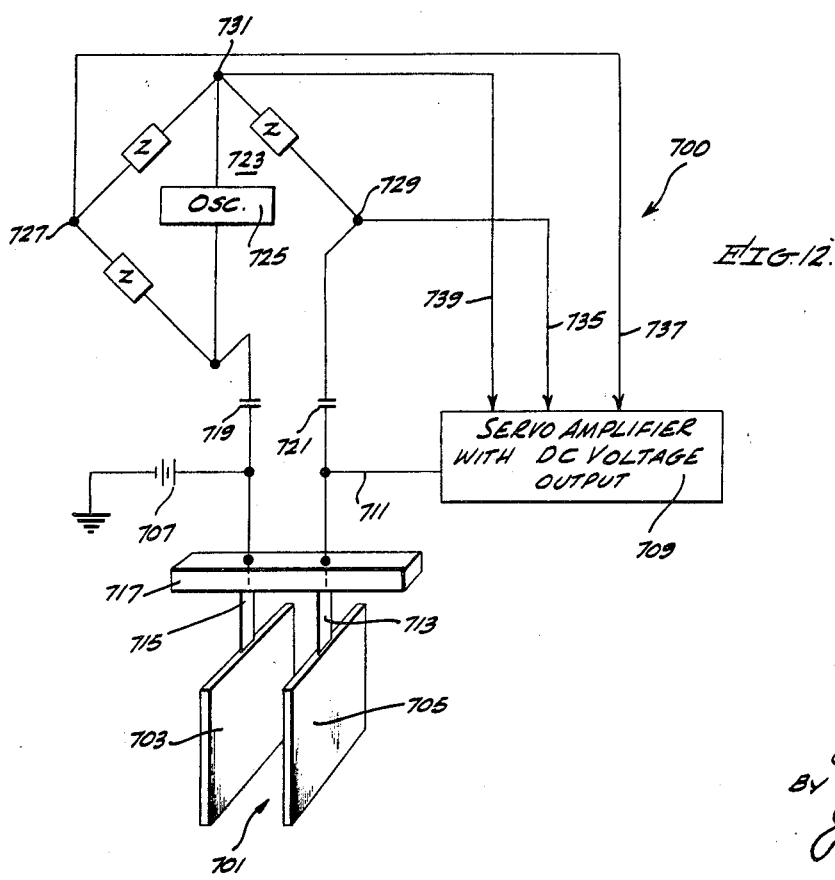
FIG. 12 is a schematic diagram of an electro-statically coupled mass quadrupole containing a servo loop circuit in accordance with yet another embodiment of the invention.

With reference to FIG. 12, there is shown a dynamic gravitational force gradient detector 700 with a mass quadrupole element 701 consisting of two parallel conducting plates 703 and 705. These plates 703 and 705 are coupled together by the electrostatic forces between them caused by the positive voltage placed on the plate 703 by the bias battery 707 and the positive or negative voltage placed on the plate 705 by a servo amplifier 709 through a conducting wire 711 and a conducting suspension strip 713. The conducting plate 703 is electrically connected to the battery 707 by means of a second conducting suspension strip 715. The conducting strips 713 and 715 are supported by an insulating member 717 of dielectric material such as ceramic. If the plates 703 and 705, which together make up a mass quadrupole 701, are acted upon by a dynamic gravitational force gradient, an increase in the relative spacing between the plates 703 and 705 will take place. This change in spacing could also occur as a decrease in the distance between the plates. Accordingly, the capacitance of the plates 703 and 705 with respect to each other will decrease or increase. As can be seen from FIG. 12, the mass quadrupole 701 is coupled by means of capacitors 719 and 721 to one leg of a conventional bridge circuit 723 wherein an oscillator 725 is connected between opposite points of the bridge. Any change in the capacitance between the plates 703 and 705 will thus cause an unbalance in the AC bridge circuit 723 driven by the oscillator 725 creating an unbalanced AC voltage between the opposite points 727 and 729 of the bridge circuit 723. This unbalanced voltage is detected by the phase sensitive servo amplifier 709 through error signal leads 735 and 737 and the voltage is thus transformed into a substantially DC voltage whose amplitude is proportional to the amplitude of the AC unbalanced voltage and whose polarity is dependent upon the phase of the AC unbalanced voltage with respect to the phase reference signal obtained from the point 731 on the bridge circuit 723 through the phase reference lead 739. The use and circuitry of such servo amplifiers as the servo amplifier 709 are well known in the art of control theory. The time constants of the phase sensitive servo amplifier 709 are chosen so that the undamped natural frequency of the servo system is substantially the same as that of the dynamic gravitational force gradient field and the damping of the phase sensitive servo amplifier 709 is adjusted so that the servo amplifier 709 operates just below a point of oscillation. With these adjustments mentioned above, the electronic circuitry including the servo amplifier 709 acts as a resonant electrodynamical circuit with a frequency corresponding to the characteristic frequency of the dynamic gravitational force gradient and a high Q for maximum coupling to the dynamic gradient field.

Figure 13:
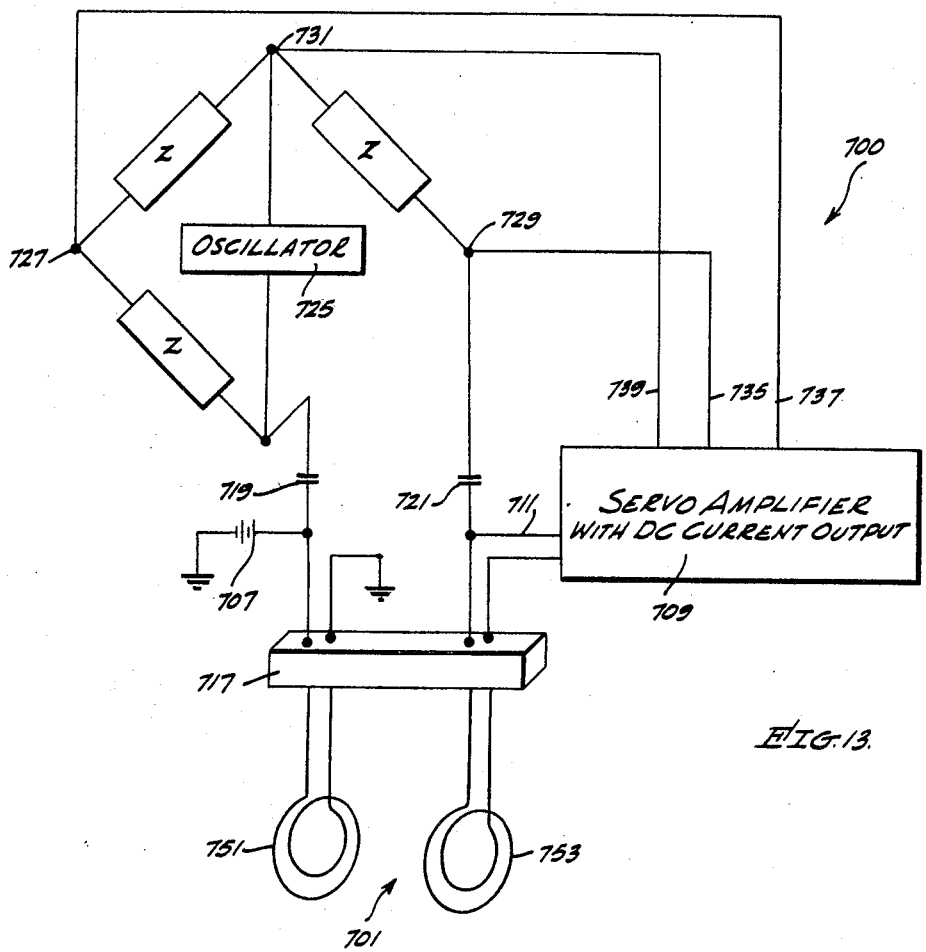
FIG. 13 is a schematic diagram of a magnetically coupled mass quadrupole similar in construction to FIG. 12.

FIG. 13 which in many respects is identical to that shown in FIG. 12 shows a mass quadrupole element consisting of two self suspending coils 751 and 753 which are coupled together by the magnetic forces between them caused by current flowing through the loop 751 from the battery 707 and a positive or negative current through the loop 753 from the servo amplifier 709. The function of the detector shown in FIG. 13 is identical to the functioning of the detector of FIG. 12.

From the foregoing, it will be seen that there is described a dynamic gravitational force gradient transducer which may be used, for example, as a means of signaling through the use of dynamic gravitational interactions, and as an instrument for the detection of geological formations, and in many other described applications.

Although several specific embodiments have been herein illustrated, it will be appreciated that other organizations of the specific arrangements shown may be made within the spirit and scope of the invention. Additionally, other components or elements may be substituted for those which have been particularly named. For example, the mechanical transducer portions of the devices can have torsional vibrational resonant modes and/or a shear vibrational resonant modes which would be excited by the torques due to the dynamic gravitational force gradients. Furthermore, since every elastic body has a multitude of mechanical vibrational resonant modes, each having a characteristic frequency, then each mode can be coupled into a separate electrical circuit having a corresponding resonant frequency to provide more information on the frequency spectrum of the dynamic gravitational force gradient field exciting the transducer. Also with reference to FIG. 10, the piezoelectric crystals 637 and 639 could alternatively be constructed of alternate layers of quartz crystal and a dielectric with a thickness corresponding to one half an acoustic wavelength. Finally, it should be understood that the embodiments of the invention described in the specification will function advantageously without elaborate means to reduce the noise factor but, of course, with reduced sensitivity.

Accordingly, it is intended that the foregoing disclosure and the drawings shall be considered only as illustrations of the principles of this invention and are not to be construed in a limiting sense.

What is claimed is:

1. A dynamic gravitational force gradient transducer, comprising: a dynamic mass quadrupole interacting with a dynamic gravitational force gradient having a characteristic frequency, the interaction occurring through a dynamic stress-energy-momentum tensor in said mass quadrupole; and electrical input-output means coupled to said mass quadrupole to form an electrodynamical circuit which is resonant at said characteristic frequency for propagating therein energy corresponding to said dynamic gravitational force gradient.

2. A dynamic gravitational force gradient transducer, comprising: a dynamic mass quadrupole including two relatively large masses coupled together by a plurality of thin longitudinal piezoelectric rods, each of said rods having two insulated electrodes covering substantially the lengths thereof, said quadrupole interacting with a dynamic gravitational force gradient having a characteristic frequency, the interaction occurring through a dynamic stress-energy-momentum tensor in said quadrupole; and electrical input-output means connected to said electrodes to form an electrodynamical circuit which is resonant at said characteristic frequency for propagating therein energy corresponding to said dynamic gravitational force gradient.

3. A dynamic gravitational force gradient generator comprising: a dynamic mass quadrupole including two relatively large masses coupled together by four symmetrically disposed thin longitudinal piezoelectric rods, each of said rods having two insulated electrodes covering substantially the lengths thereof, said quadrupole interacting with a dynamic gravitational force gradient having a characteristic frequency, the interaction occurring through a dynamic stress-energy-momentum tensor in said quadrupole; and electrical input means including an alternating voltage generator connected to said electrodes to form an electrodynamical circuit which is resonant at said characteristic frequency and propagating therein energy which excites said stress-energy-momentum tensor.

4. A dynamic gravitational force gradient detector, comprising: a dynamic mass quadrupole including two relatively large masses coupled together by four symmetrically disposed thin longitudinal piezoelectric rods, each of said rods having two insulated electrodes covering substantially the lengths thereof, said quadrupole interacting with a dynamic gravitational force gradient having a characteristic frequency, the interaction occurring through a dynamic stress-energy-momentum tensor in said quadrupole; and electrical output means including a balanced low noise preamplifier connected to said electrodes to form an electrodynamical circuit which is resonant at said characteristic frequency for propagating therein energy corresponding to the magnitude and phase of said dynamic gravitational force gradient.

5. A dynamic gravitational force gradient generator, comprising: a cylindrical aluminum body of elastic material with distributed mass including a dynamic mass quadrupole, said quadrupole generating a dynamic gravitational force gradient having a characteristic frequency, said generation occurring through a dynamic stress-energy-momentum tensor in said mass quadrupole; and electrical input means including piezoelectric strain transducers attached to said aluminum body to form an electrodynamical circuit which is resonant at said characteristic frequency for propagating therein energy corresponding to the magnitude and phase of said dynamic gravitational force gradient.

6. A dynamic gravitational force gradient generator, comprising: a body of elastic material with distributed mass including a dynamic mass quadrupole moment, said quadrupole interacting with and capable of generating a dynamic gravitational force gradient having a characteristic frequency, the interaction occurring through a dynamic stress-energy-momentum tensor in said mass quadrupole; and electrical input means including an alternating voltage generator coupled to said body of elastic material to form an electrodynamical circuit which is resonant at said characteristic frequency for propagating therein energy corresponding to the magnitude and phase of said dynamic gravitational force gradient.

7. A dynamic gravitational force gradient generator, comprising: a cylindrical aluminum body with distributed mass including a dynamic mass quadrupole moment, said quadrupole generating a dynamic gravitational force gradient having a characteristic frequency, said generation occurring through a dynamic stress-energy-momentum tensor in said mass quadrupole, said cylindrical aluminum body being supported at its center by support means including a loop of wire; and electrical input means including piezoelectric strain transducers attached symmetrically about said body with respect to said loop of wire to form an electrodynamical circuit which is resonant at a selected frequency for propagating therein energy corresponding to said dynamic gravitational force gradient.

8. A dynamic gravitational force gradient detector, comprising: a dynamic mass quadrupole arrangement including a piezoelectric quartz crystal disposed in a resonant cavity structure, said quadrupole arrangement being coupled to a dynamic gravitational force gradient having a characteristic frequency, said coupling occurring through a dynamic stress-energy-momentum tensor in said quadrupole arrangement, said resonant cavity being electromagnetically resonant at said characteristic frequency; and electrical output means including a low noise maser amplifier-detector arrangement coupled to said resonant cavity for providing an output from said detector.

9. A dynamic gravitational force gradient detector, comprising: a dynamic mass quadrupole arrangement including a pair of superconducting spheres coupled together by magnetic fields, said quadrupole arrangement being coupled to a dynamic gravitational force gradient having a characteristic frequency, said coupling occurring through a dynamic stress-energy-momentum tensor in said quadrupole arrangement, said magnetic field being created by a set of superconducting coils carrying persistent currents; and electrical output means including a coupling loop for sensing variations of said magnetic fields to form an electrodynamical circuit which is resonant at said characteristic frequency.

10. A dynamic gravitational force gradient detector, comprising: a dynamic mass quadrupole arrangement including a pair of piezoelectric quartz crystals each disposed in one of two resonant cavity structures sharing a common wall, said quadrupole arrangement being coupled to a dynamic gravitational force gradient having a characteristic frequency, said coupling occurring through a dynamic stress-energy-momentum tensor in said quadrupole arrangement, said resonant cavities being electromagnetically resonant at said characteristic frequency, said crystals being an odd number of quarter-wavelengths long at said characteristic frequency and being attached by one surface to opposite sides of said common wall; and electrical output means including conductive electrodes disposed in each of said cavities and insulated from walls thereof opposite said common wall.

11. A dynamic gravitational force gradient generator, comprising: a dynamic mass quadrupole arrangement including a pair of piezoelectric quartz crystals each disposed in one of two resonant cavity structures sharing a common wall, said quadrupole arrangement generating a dynamic gravitational force gradient having a characteristic frequency, the generation occurring through a dynamic stress-energy-momentum tensor in said quadrupole arrangement, said resonant cavities being electromagnetically resonant at said characteristic frequency, said crystals being an odd number of quarter-wavelengths long at said characteristic frequency and being attached by one surface to opposite sides of said common wall; and electrical input means including conductive electrodes disposed in each of said cavities and insulated from walls thereof opposite said common wall, said input means further including an alternating voltage generator connected to said electrodes for exciting said resonant cavities.

* * * * *